United States Patent
Kristensen (10) Patent No.: US 7,785,040 B2
(45) Date of Patent: Aug. 31, 2010

(54) FOUNDATION AND A METHOD FOR FORMING A MONO PILE FOUNDATION

(75) Inventor: Jonas Kristensen, Skjern (DK)

(73) Assignee: Vestas Wind Systems A/S, Randers SV (DK)

( * ) Notice: Subject to any disclaimer, the term of this patent is extended or adjusted under 35 U.S.C. 154(b) by 0 days.

(21) Appl. No.: 12/628,501

(22) Filed: Dec. 1, 2009

(65) Prior Publication Data

US 2010/0135730 A1    Jun. 3, 2010

Related U.S. Application Data

(60) Provisional application No. 61/118,754, filed on Dec. 1, 2008.

(30) Foreign Application Priority Data

Dec. 1, 2008    (DK) .............................. 2008 01690

(51) Int. Cl.
  *E02D 7/00*    (2006.01)
  *E02D 27/32*    (2006.01)
(52) U.S. Cl. .................. 405/236; 405/233; 52/292; 52/742.14
(58) Field of Classification Search ................. 405/229, 405/231–233, 236, 243, 175; 52/292–299, 52/742.1, 742.13, 742.14
  See application file for complete search history.

(56) References Cited

U.S. PATENT DOCUMENTS

| 4,180,350 | A |   | 12/1979 | Watts |
| 4,484,842 | A |   | 11/1984 | Engelhaupt |
| 5,013,191 | A | * | 5/1991  | Kitanaka .................. 405/233 |
| 5,957,624 | A | * | 9/1999  | Carter et al. ............. 405/129.6 |
| 2001/0022240 | A1 |  | 9/2001 | Beck, III |

FOREIGN PATENT DOCUMENTS

| JP | 02183011 | 7/1990 |
| JP | 02200917 | 8/1990 |
| WO | 01/66861 | 9/2001 |
| WO | 02/27105 | 4/2002 |
| WO | 02/099203 | 12/2002 |

OTHER PUBLICATIONS

Lennart Bitsch; Office Action issued in related Danish Patent Application No. PA 2008 01690; Jul. 6, 2009; 6 pages; Danish Patent and Trademark Office.
Lennart Bitsch; Search Report issued in related Danish Patent Application No. PA 2008 01690; Jun. 25, 2009; 1 page; Danish Patent and Trademark Office.

* cited by examiner

*Primary Examiner*—Tara Mayo-Pinnock
(74) *Attorney, Agent, or Firm*—Wood, Herron & Evans, L.L.P.

(57) ABSTRACT

This invention relates to a method for forming a mono pile foundation in soil for a wind turbine tower including drilling a plurality of holes into the soil, the plurality of holes being arranged along a curve having a contour corresponding to a cross-dimensional shape of the mono pile, and placing the mono pile in an annular cavity, the annular cavity being formed by the plurality of holes alone and/or by the mono pile breaking up intermediate soil walls between adjacent holes in the plurality of holes while being placed therein. A foundation in soil for a wind turbine tower, a wind turbine comprising such a foundation, and use of such a foundation in a wind turbine is also disclosed.

4 Claims, 5 Drawing Sheets

FOUNDATION AND A METHOD FOR FORMING A MONO PILE FOUNDATION

CROSS-REFERENCE TO RELATED APPLICATIONS

This application claims priority under 35 U.S.C. §119(a) to DK Application No. PA 2008 01690, filed Dec. 1, 2008. This application also claims the benefit of U.S. Provisional Application No. 61/118,754, filed Dec. 1, 2008. Each of these applications is incorporated by reference herein in its entirety.

TECHNICAL FIELD

The present invention generally relates to a method for forming a mono pile foundation in soil for a wind turbine tower, comprising drilling a plurality of holes into the soil and placing the mono pile in an annular cavity. The annular cavity is formed by the plurality of holes alone, and/or by the mono pile breaking up intermediate soil walls between adjacent holes in the plurality of holes while being placed therein. The present invention further relates to a foundation in soil for a wind turbine tower, a wind turbine comprising such a foundation, and use of such a foundation in a wind turbine.

BACKGROUND

A wind turbine tower is generally 30-80 m in height and has a diameter of 2-10 m. Typical modern tower weights are 40 tons for a 50 m tower for a turbine with a 44 m rotor diameter (600 kW), and 80 tons for a 60 m tower for a 72 m rotor diameter. Due to the height and weight of the wind turbine tower, the forces formed by rotational movements of the wind turbine blades, and the very large surface of the tower being exposed to the wind, the tower must be steadily fastened to the ground.

Depending on soil conditions, for example rock, soil or gravel, different kinds of foundations are used for securing the wind turbine tower to the ground. One way of forming a foundation is to form a concrete foundation in a recess, arrange a support structure on the concrete foundation, form a connection to the tower, and arrange anchors into drilled holes in the ground for securing the foundation to the ground.

Another type of foundation for a wind turbine is a mono pile foundation. The mono pile foundation comprises a tubular element, having a length exceeding the diameter, which is forced into the ground by hammering or vibrating. This technique works well as long as the ground does not contain any unexpected objects, like rocks. However, the mono pile is subjected to very large forces when being hammered into the ground. Consequently, the mono pile must be reinforced in order to resist the forces resulting from the hammering. Additionally, vibrating the mono pile into the ground works well in sand but not in clay.

WO 01/66861 discloses a device and a method for anchoring a foundation for a wind turbine tower to a rock bed. This solution represents an embedment foundation, as the anchoring portion is embedded in concrete and may be provided with anchors, and the height of the anchoring portion approximately corresponds to the diameter of the anchoring portion.

SUMMARY

In view of the above, embodiments in accordance with the invention provide an improvement over the above described techniques and prior art.

In particular, one embodiment provides a method for forming a mono pile foundation and a foundation in soil, which does not have to be hammered or vibrated into the ground.

Another embodiment provides a method for forming a mono pile foundation and a foundation in soil, which does not require any anchors in order to obtain the necessary stability of the foundation.

According to a first aspect, a method for forming a mono pile foundation in soil for a wind turbine tower comprises drilling a plurality of holes into the soil, the plurality of holes being arranged along a curve having a contour corresponding to a cross-dimensional shape of the mono pile, placing the mono pile in an annular cavity, the annular cavity being formed by the plurality of holes alone and/or by the mono pile breaking up intermediate soil walls between adjacent holes in the plurality of holes while being placed therein.

An advantage of the inventive method is that forming the mono pile foundation is facilitated, as a cavity, corresponding to the shape of the mono pile, is formed before the mono pile is introduced into the soil and/or as the mono pile is being placed therein. Accordingly, the force required for placing the mono pile in the ground is reduced, compared to hammering or vibrating the mono pile into the ground. If the annular cavity is formed by the mono pile breaking up intermediate soil walls between adjacent holes, the force required for placing the mono pile in the soil only has to exceed the resistance of the intermediate walls between adjacent holes. The force required for placing the mono pile in the soil is still further reduced if the plurality of holes form the annular cavity before placing the mono pile therein.

As the force required for placing the mono pile in the soil is reduced, the mono pile does not have to be hammered or vibrated into the ground as in prior-art mono pile solutions. Consequently, the mono pile does not have to be reinforced in order to resist the forces resulting from the installation process. Thus, the weight of the mono pile is reduced, resulting in material savings and in that transport of the mono pile is facilitated.

A further advantage is that it is possible to divide the mono pile into sections in the vertical direction. Dividing the mono pile into sections facilitates transport of the mono pile to the construction site. Before arranging the mono pile, the mono pile sections are attached to each other. For example, the mono pile sections may be provided with a flange, and be attached to each other in any conventional way. In the prior-art solutions, when hammering or vibrating the mono pile into the soil, the flanges of the attached mono pile sections cause a large resistance, thus hindering using more than one mono pile section. When using the inventive method, forming the cavity reduces the resistance when arranging the mono pile, even if the mono pile comprises multiple sections attached to each other by a flange.

As the foundation is of the mono pile type, the mono pile itself provides the necessary rigidity and stabilization of the foundation. No anchors or concrete foundations are required to stabilize and secure the foundation. Consequently, forming the foundation is facilitated, compared to an embedment foundation comprising a concrete foundation, anchors, anchoring portion etc, as the inventive foundation only includes one major part, i.e., the mono pile.

When drilling the plurality of holes, a first hole may be drilled and filled with a temporary filling material before a subsequent hole adjacent the first hole is drilled. Thus, the first hole does not collapse when drilling the subsequent adjacent hole. Further, filling the first hole with the temporary filling material prevents the first hole from being refilled with soil from the subsequent hole.

The method may further comprise arranging a reinforcement element in at least one of the plurality of holes. The reinforcement element prevents the hole from collapsing before the mono pile is placed in the hole.

The method may further comprise driving the mono pile into the annular cavity. Some force may be required for placing the mono pile in the cavity if the annular cavity is formed by the mono pile breaking up intermediate soil walls between adjacent holes. The force is required to break up the intermediate soil walls between adjacent holes, such that the annular cavity is formed, and depends on the width of the intermediate soil walls.

The method may further comprise filling remaining portions of the holes with soil and/or concrete after placing the mono pile. When the mono pile is placed in the cavity, portions of the holes may remain as a cavity. By filling these portions with soil or concrete, the mono pile foundation is further reinforced and provides additional rigidity and stabilization.

The method may further comprise removing the temporary filling material after placing the mono pile by filling the remaining portions of the holes with concrete from below. The concrete may be fed from additional holes adjacent the holes forming the annular cavity. Because the additional holes extend to the bottom of the annular cavity, the temporary filling material is removed and replaced with the concrete, thus further stabilizing the foundation.

The method may further comprise drilling the plurality of holes such that they are partly overlapping each other. When the holes are partly overlapping, a continuous annular cavity corresponding to the shape of the mono pile is formed, having no intermediate walls between adjacent holes, already before placing the mono pile therein. Thereby, placing the mono pile in the cavity is further facilitated and the force required for placing the mono pile in the cavity is further reduced.

According to a second aspect, embodiments in accordance with the invention include a foundation in soil for a wind turbine tower comprising a mono pile having a tubular shape, and a plurality of holes forming an annular cavity corresponding to a cross-dimensional shape of the mono pile, the mono pile being placed in the annular cavity, the annular cavity being formed by the plurality of holes alone and/or by the mono pile breaking up intermediate soil walls between adjacent holes in the plurality of holes while being placed therein.

An advantage of the inventive foundation is that the mono pile itself provides the necessary rigidity and stabilization of the foundation, as the foundation is of the mono pile type. No anchors or concrete foundations are required to stabilize and secure the foundation. Consequently, the foundation comprises fewer parts and is simplified, compared to an embedment foundation comprising a concrete foundation, anchors, anchoring portion etc, as the inventive foundation only includes one major part, i.e., the mono pile.

A further advantage is that the foundation does not have to be reinforced since the foundation does not have to be hammered or vibrated into the ground. Instead, the foundation is placed in the cavity being preformed and/or formed as the mono pile is placed therein.

Further, as the foundation does not have to be reinforced, the weight of the mono pile is reduced, resulting in material savings and in that transport of the mono pile is facilitated.

Another advantage is that it is possible to divide the mono pile into sections in the vertical direction, thereby facilitating transport of the mono pile to the construction site. Before arranging the mono pile, the mono pile sections are attached to each other, for example, by using a flange provided on the mono pile sections. In the prior-art solutions, when hammering or vibrating the mono pile into the soil, the flanges of attached mono pile sections cause a large resistance, thus hindering using more than one mono pile section. Forming a cavity as in the inventive foundation reduces the resistance when arranging the mono pile, even if the mono pile comprises multiple sections attached to each other by a flange.

An upper portion of the mono pile may be protruding above the soil and a lower portion of the mono pile may be placed in the annular cavity. The first portion may comprise an interface to the tower, for example, a flange corresponding to a mating element arranged on the tower. The second portion being placed in the soil provides the necessary stability of the wind turbine tower.

A ratio between a depth of the lower portion of the mono pile and a diameter of the mono pile may be at least 2:1. For a mono pile foundation, designed as a single pile, the depth of the mono pile being introduced into the soil must be sufficiently large as to provide the required stabilization of the wind turbine tower.

The holes may partly overlap each other. When the holes are partly overlapping, a continuous annular cavity corresponding to the shape of the mono pile is formed, having no intermediate walls between adjacent holes. Thus, placing the mono pile in the cavity is further facilitated and the forces required to introduce the mono pile into the cavity is further reduced.

A distance in a radial direction of the mono pile of an overlapping portion between adjacent holes may exceed a wall thickness of the mono pile. Consequently, the force required for placing the mono pile in the soil is reduced, since a continuous cavity corresponding to the shape of the mono pile is preformed. When the mono pile is arranged into the cavity, parts of the holes remain as a cavity, which may be filled with soil or concrete.

A distance in a radial direction of the mono pile of an overlapping portion between adjacent holes may correspond to a wall thickness of the mono pile. Consequently, the force required for placing the mono pile in the soil is reduced, since a continuous cavity corresponding to the shape of the mono pile is preformed. When the mono pile is arranged into the cavity, parts of the holes remain as a cavity, which may be filled with soil or concrete.

A distance in a radial direction of the mono pile of an overlapping portion between adjacent holes may be smaller than a wall thickness of the mono pile.

Remaining portions of the holes may be filled with soil, concrete, or a temporary filling material. When the mono pile is placed in the cavity, portions of the holes may remain as a cavity. By filling these portions with soil or concrete, the foundation is further reinforced and provides additional rigidity and stabilization.

According to a third aspect, embodiments in accordance with the invention include a wind turbine comprising a foundation according to the second aspect as discussed above. The wind turbine comprising the foundation according to the second aspect incorporates all the advantages of the foundation, which previously have been discussed, whereby the previous discussion is applicable.

According to a fourth aspect, embodiments in accordance with the invention include use of a foundation according to the second aspect. Use of a foundation according to the second aspect incorporates all the advantages of the foundation, which previously have been discussed, whereby the previous discussion is applicable.

Other objectives, features and advantages of embodiments in accordance with the invention will appear from the following detailed disclosure, from the attached claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages, will be better understood through the following illustrative and non-limiting detailed description of preferred embodiments of the present invention, with reference to the appended drawings, where the same reference numerals will be used for similar elements, wherein.

DETAILED DESCRIPTION

Figure 1:
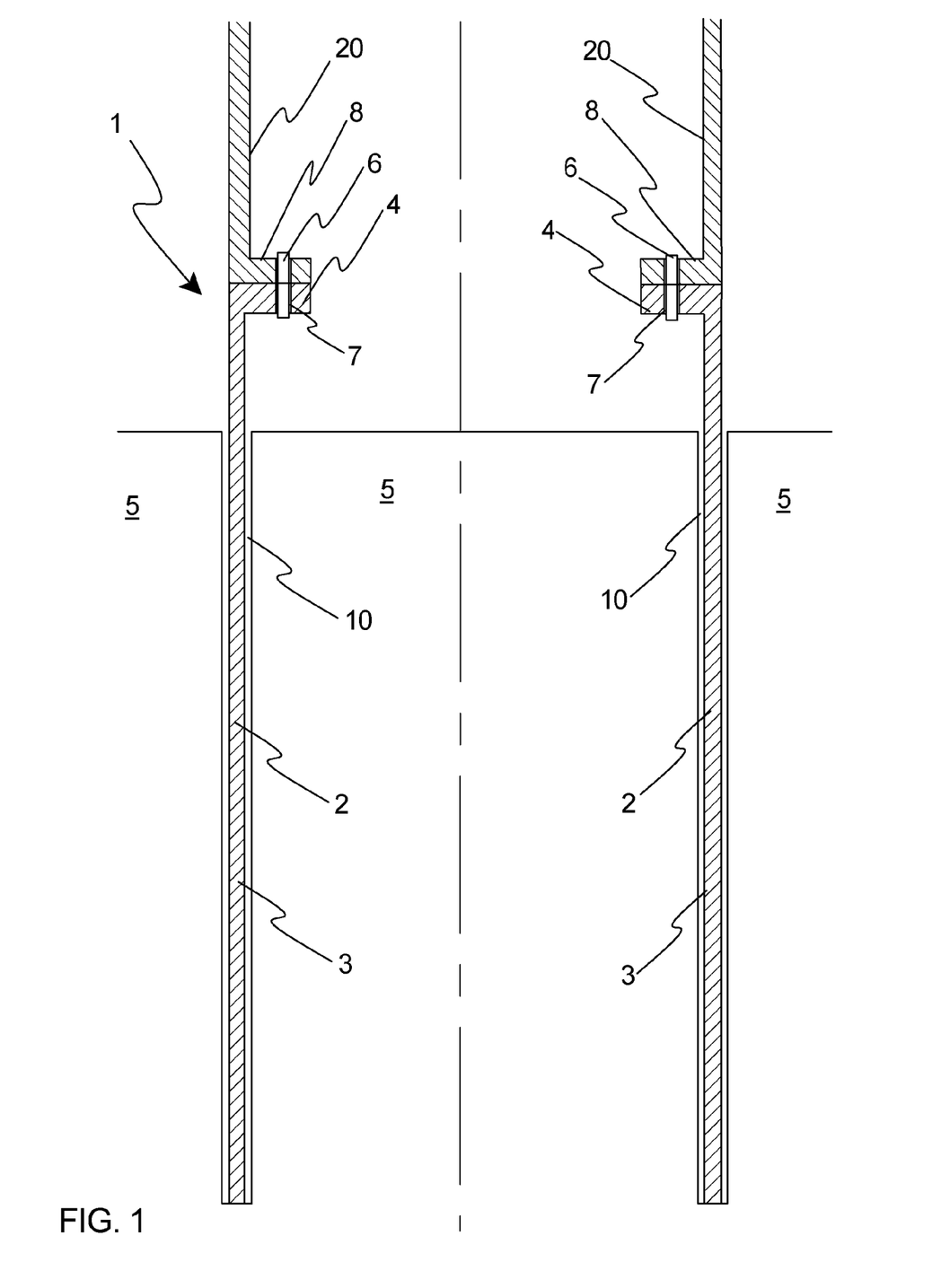
FIG. 1 schematically illustrates a cross section of a foundation for a wind turbine.

With reference to FIG. 1, a foundation 1 for a wind turbine tower 20 will be described. The foundation 1 is formed of a mono pile 2 having a tubular shape. The mono pile 2 may be formed of one tubular element 3, or may be formed of a plurality of segments in the circumferential direction, which together form the tubular element 3. In the vertical direction, mono pile 2 may be formed of more than one section, which together form the tubular element 3. The sections may be attached to each other by a flange arranged at an end portion of each section in any conventional way.

A mono pile is a type of foundation for a wind turbine tower, which is not arranged on a concrete foundation, and is not secured to the ground by using anchors. Instead, the length of the mono pile being arranged in the ground provides the stabilization of the wind turbine tower. Compared to an embedment foundation, the depth of the mono pile being introduced into the soil exceeds the diameter of the mono pile.

The mono pile 2 is suitable to be placed in soil 5, such as for example sand or clay.

The mono pile 2 is placed in a cavity 10 having a shape corresponding to the tubular shape of the mono pile 2. An upper portion of the mono pile is protruding above the soil, and forms a connection to the wind turbine tower 20. The upper portion of the mono pile 2 may comprise a flange 4 forming an interface to the tower 20. The wind turbine tower 20 may comprise a corresponding flange 8, and the mono pile 2 may be attached to the tower 20 by passing a bolt 6 through a hole 7 arranged in the flanges 4, 8. The wind turbine tower 20 may be formed of a plurality of tower segments in the circumferential direction, each forming a portion of the tower 20. A lower portion of the mono pile 2 is placed in the cavity 10 in the soil 5.

The ratio between the depth of the lower portion of the mono pile being introduced into the soil and the diameter of the mono pile 2 is at least 2:1. The depth of the lower portion of the mono pile 2 being placed in the soil 5 must be sufficiently large such that a stable support is formed for the wind turbine tower 20. The depth of the lower portion depends on tower height, soil conditions, expected loads etc.

Portions of the cavity 10 may remain as a cavity even after the mono pile 2 has been placed in the cavity 10. These remaining portions may be filled with concrete. By filling any remaining cavities with concrete, the foundation 1 is further reinforced. The concrete filling also forms an anchoring to the soil.

Figure 2A:
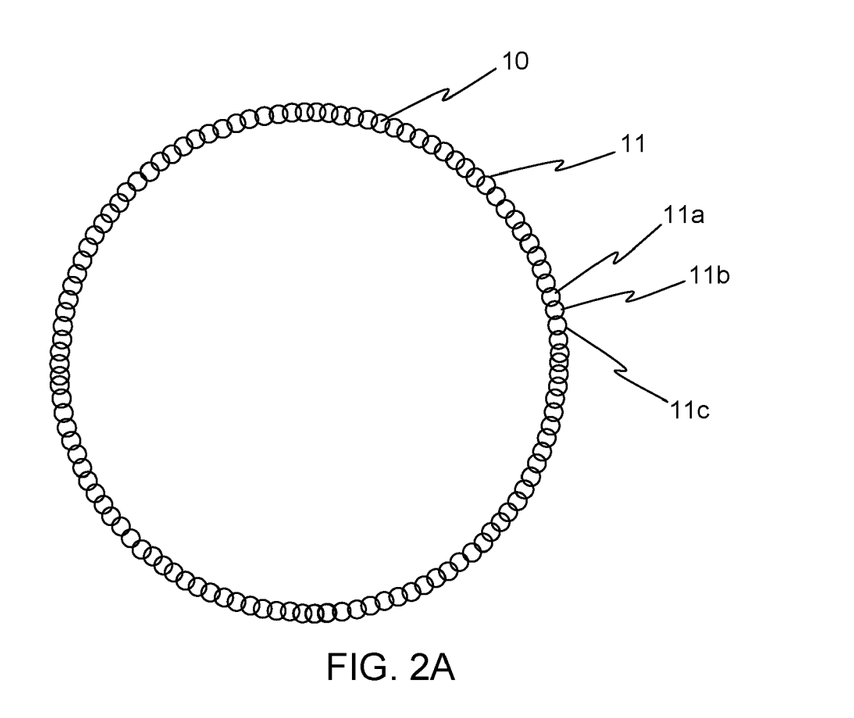
FIG. 2A schematically illustrates a plurality of partly overlapping holes formed into the soil, forming an annular cavity.
Figure 2B:
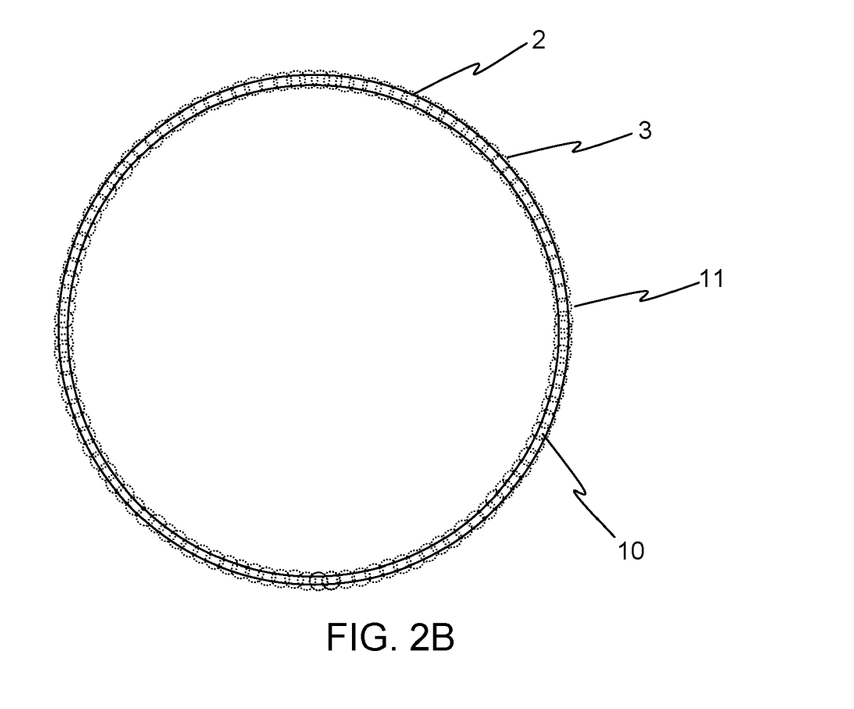
FIG. 2B schematically illustrates the foundation in FIG. 1 as seen from above and placed in the annular cavity.

FIGS. 2A and 2B illustrate the cavity 10 as seen from above, in FIG. 2A before the mono pile 2 is placed in the cavity 10, and in FIG. 2B when the mono pile 2 is placed in the cavity 10. The cavity 10 has an annular shape, essentially corresponding to the annular shape of the mono pile 2.

Figure 2C:
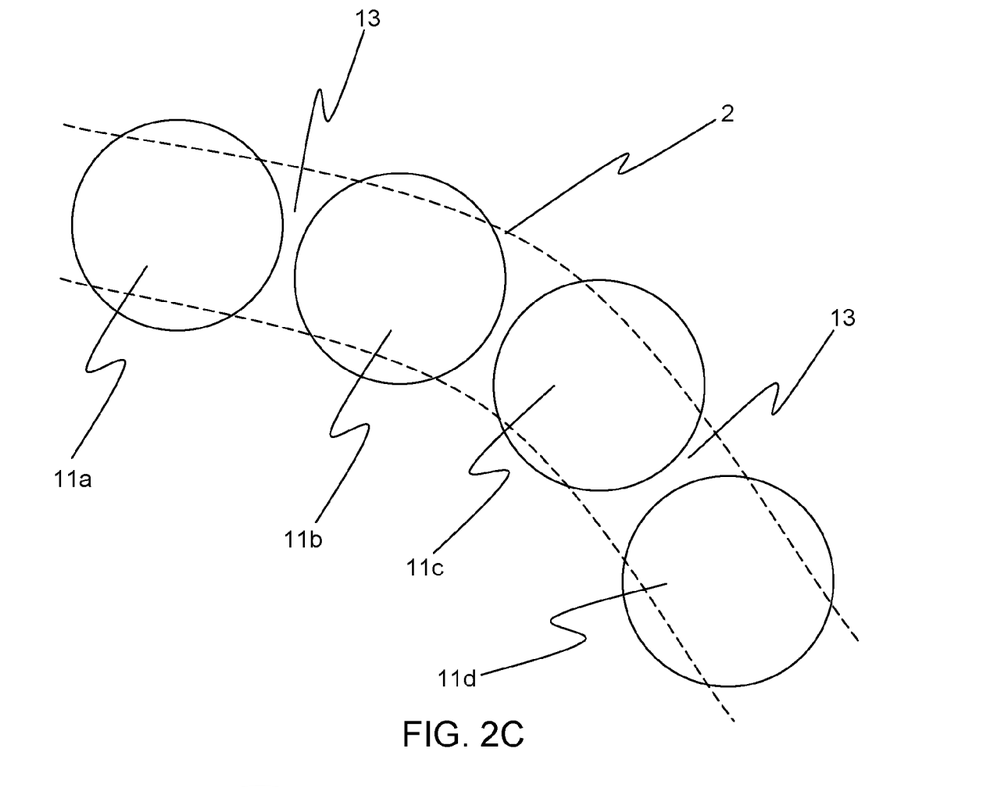
FIG. 2C schematically illustrates a plurality of holes arranged at a distance from each other.

When forming the inventive foundation 1, a plurality of holes 11 are drilled into the soil 5. The holes 11 are arranged along a contour corresponding to the cross-dimensional shape of the mono pile 2. If the holes 11 are partly overlapping, as shown in FIG. 2A, the plurality of holes 11 forms the annular cavity 10. The mono pile 2 is then placed in the annular cavity 10. If intermediate soil walls 13 remain between adjacent holes when the holes are drilled, as shown in FIG. 2C, the plurality of holes 11 prepares for an annular cavity 10 to be formed. When placing the mono pile 2 in the holes 11, the mono pile 2 breaks the intermediate soil walls 13 such that they collapse. Thereby, the annular cavity 10 is formed while placing the mono pile 2.

The annular cavity 10 may also be formed as a combination of the above described situations. For example, in a first portion, the holes 11 may be partly overlapping, thereby forming a cavity already before the mono pile 2 being placed in the cavity 10. In another portion, the holes 11 may be arranged adjacent each other, being separated by an intermediate wall 13. In this portion, the annular cavity 10 is formed when the mono pile 2 is being placed in the cavity 10. Additionally, the diameter of the holes 11 may be smaller than the wall thickness of the mono pile 2. In this case, a cavity 10 corresponding to the shape and wall thickness of the mono pile 2 is formed when the mono pile 2 is being placed in the cavity.

When drilling the holes 11 for forming or preparing for the cavity 10, a first hole 11a is drilled into the soil 5. A second hole 11b is then drilled adjacent the first hole 11a. A third hole 11c is then drilled adjacent the second hole 11b. This procedure continues until a plurality of holes 11 arranged along a curve having a contour corresponding to the cross-dimensional shape of the mono pile 2 is formed, as shown in FIG. 2A.

Figure 2D:
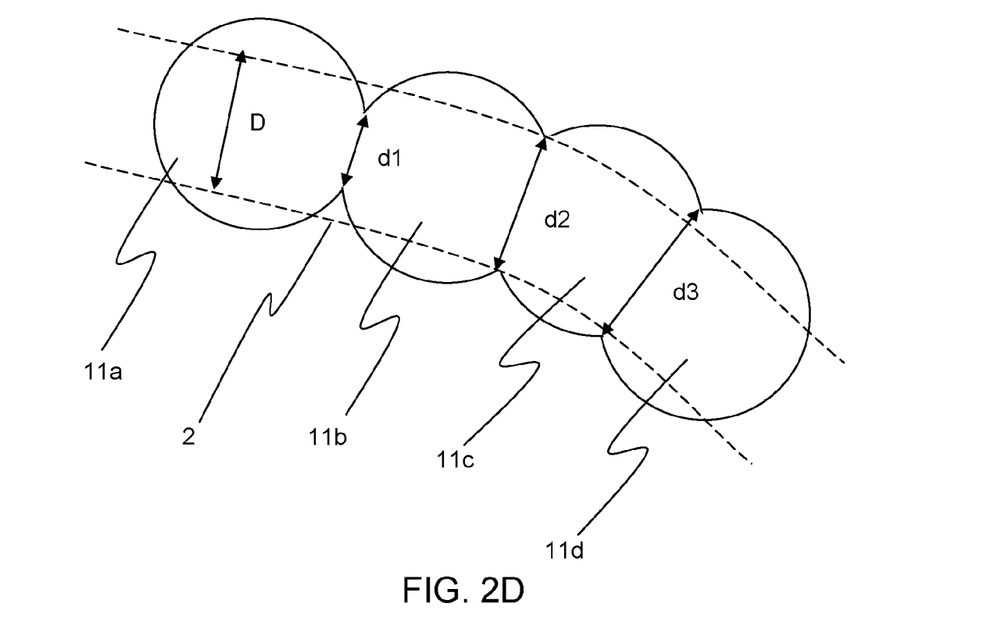
FIG. 2D schematically illustrates how an overlapping portion of adjacent holes may be varied.

If the holes 11 are partly overlapping, the distance d1, d2 and d3 in the radial direction of the mono pile of an overlapping portion may either exceed, correspond or be smaller than the wall thickness D of the mono pile 2, which is shown in FIG. 2D. If the distance d1 of the overlapping portion is smaller than the wall thickness D of the mono pile 2, some force is required to place the mono pile 2 in the cavity in order to widen the cavity 10.

Further, the diameter of the holes 11 may either exceed, be smaller than or equal the wall thickness of the mono pile 2. If the wall thickness D of the mono pile 2 exceeds the diameter of the holes 11, no cavity remains when the mono pile is placed in the annular cavity 10.

Figure 3A:
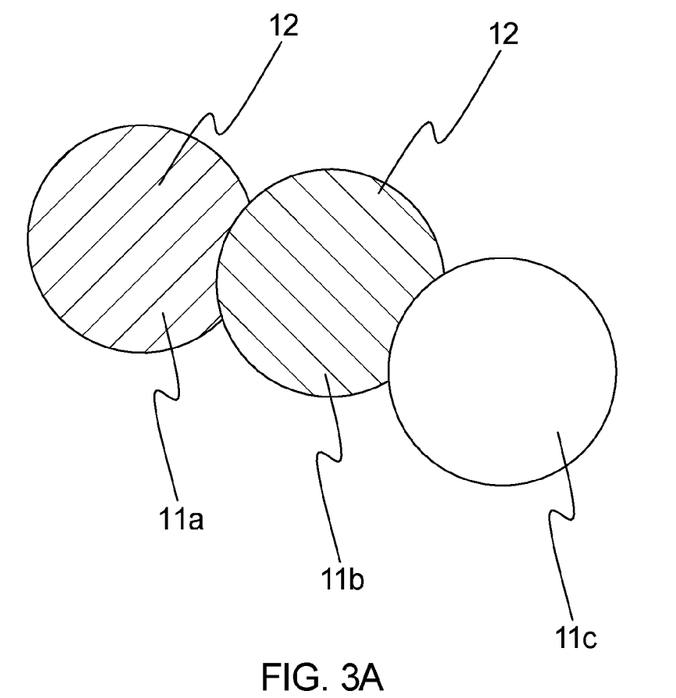
FIG. 3A schematically illustrates how a temporary filling material is arranged in the holes during the drilling process.

With reference to FIG. 3A, drilling the holes 11 will be described in more detail. A first hole 11a is drilled into the soil 5, as previously described. Before drilling a second hole 11b, the first hole 11a is filled with a temporary filling material 12. The temporary filling material 12 may be bentonite, or any other suitable temporary filling material. The temporary filling material 12 prevents the first hole 11a from collapsing when drilling the adjacent hole.

When the first hole 11a is filled with the temporary filling material 12, the second hole 11b is drilled. The second hole 11b is then filled with the temporary filling material 12 before drilling a third hole 11c. This process is continued until a plurality of holes 11 arranged along a curve having a contour corresponding to the cross-dimensional shape of the mono pile 2 is formed.

Before arranging the mono pile 2 in the formed or prepared annular cavity 10, the temporary filling material 12 arranged in the holes 11 is dissolved using a suitable chemical or water if needed. If using bentonite as a temporary filling material, it is not necessary to dissolve the bentonite before arranging the mono pile 2 due to the material properties of bentonite.

Alternatively, the holes 11 do not have to be drilled in a sequence, one after another. After drilling the first hole 11a and filling the first hole 11a with the temporary filling material 12, a second hole (e.g., hole 11c or 11d) may be drilled at a distance from the first hole 11a along the contour of the curve corresponding to the cross-dimensional shape of the mono pile 2 and not adjacent the first hole 11a. After a while, after having drilled holes at a distance from the first hole 11a, the hole 11b adjacent the first hole is drilled. Thereby, the temporary filling material 12 has had time to harden, and the risk that the first hole collapses when drilling the adjacent hole 11b is further reduced.

After dissolving the temporary filling material 12, if necessary, the mono pile 2 is arranged in the cavity 10 in the soil 5. If the diameter of the holes 11 exceeds the wall thickness of the mono pile 2, a portion of the holes 11 will remain as a cavity, which is shown in FIGS. 2C and 2D.

Figure 4:
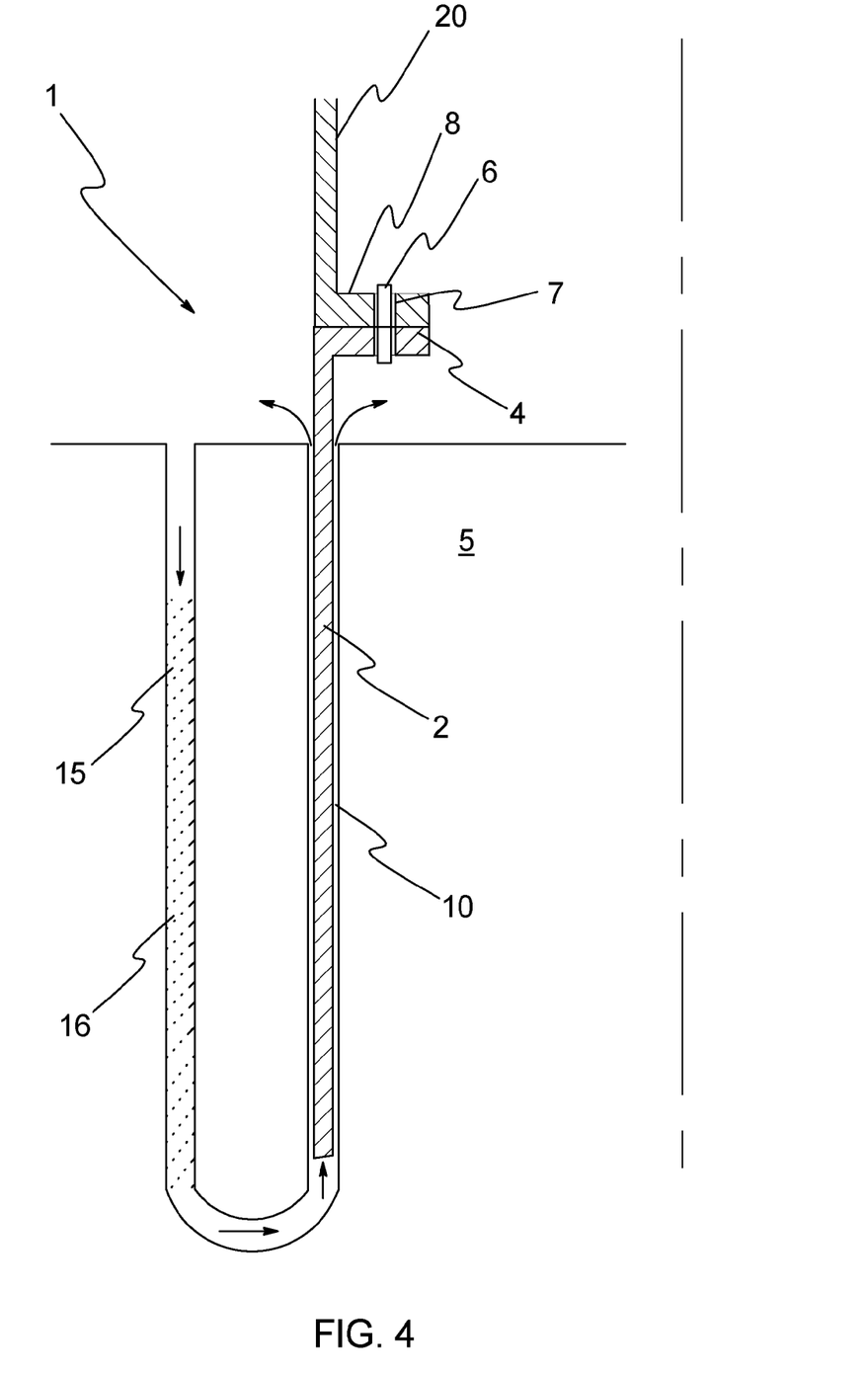
FIG. 4 schematically illustrates how concrete is introduced into the cavity, thereby removing the temporary filling material.

In order to fill any remaining portions of the holes 11, and to further stabilize the foundation 1, concrete 16 is introduced into the cavity 10 from below, as shown in FIG. 4. The concrete 16 is introduced into an additional hole 15 being arranged adjacent the cavity 10 and extending along the cavity 10. The concrete 16 flows into a lower portion of the cavity 10, thus pressing any remaining temporary filling material 12 upwards. The cavity 10 is thereby filled with concrete 16 from below.

Even if the temporary filling material 12 is dissolved by using a chemical, some of the temporary filling material 12 may remain in the cavity 10. Thereby, the cavity 10 may be filled with a mixture of concrete, soil and temporary filling material. However, for obtaining the best stabilization of the foundation 1, all temporary filling material 12 should, if possible, be replaced with concrete. The temporary filling material 12 used to temporarily fill the holes 11 during drilling does not possess enough bearing capacity for stabilizing the foundation 1.

Figure 3B:
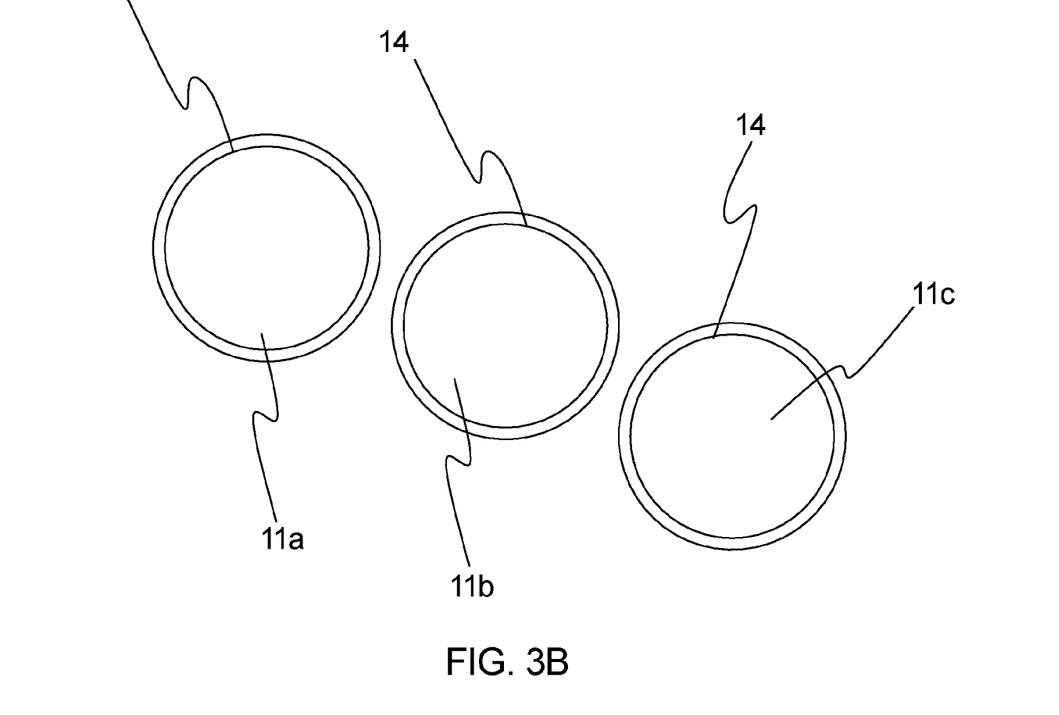
FIG. 3B schematically illustrates how reinforcement elements are arranged in the holes.

As an alternative to filling the holes 11 with a temporary filling material 12, a reinforcement element 14 may be arranged in the holes 11 for temporarily reinforcing the holes 11, which is shown in FIG. 3B. One reinforcement element 14 is adapted to be placed in one of the plurality of holes 11. The reinforcement element 14 may be a tubular element, for example made of plastic. Alternatively, the reinforcement element 14 may be a reinforcing structure, or a wiring. The reinforcement element 14 is adapted to withstand the forces directed from the surrounding soil in order to prevent the hole 11 from collapsing, but is adapted to break when the mono pile 2 is placed in the cavity 10. For example, the material in the reinforcement element 14 may be weakened by perforations in the material, or having weaker portions. When the mono pile 2 is placed in the cavity 10, the reinforcement element 14 breaks, or partly breaks, such that the reinforcement element 14 does not hinder the mono pile 2 from being placed in the cavity 10.

It is contemplated that the mono pile may have any other shape, and that the corresponding cavity may have any other shape. Further, even if circular holes are shown, the holes may have any other shape. It is also contemplated that the interface to the wind turbine tower may have another design.

The invention has mainly been described above with reference to a few embodiments. However, as is readily appreciated by a person skilled in the art, other embodiments than the ones disclosed above are equally possible within the scope of the invention, as defined by the appended patent claims.

What is claimed is:

1. A method for forming a mono pile foundation in soil for a wind turbine tower, comprising drilling a plurality of holes into the soil, the plurality of holes being arranged along a curve having a contour corresponding to a cross-dimensional shape of the mono pile, wherein a first hole is drilled and filled with a temporary filling material before a subsequent hole adjacent the first hole is drilled;

placing the mono pile in an annular cavity, the annular cavity being formed by the plurality of holes alone and/or by the mono pile breaking up intermediate soil walls between adjacent holes in the plurality of holes while being placed therein;

forming an additional hole adjacent the annular cavity so as to be in communication with a lower portion of the cavity; and introducing concrete into the cavity using the additional hole so as to fill the remaining portions of the holes with concrete after placing the monopile.

2. The method according to claim 1, wherein placing the mono pile comprises driving the mono pile into the annular cavity.

3. The method according to claim 1, further comprising removing the temporary filling material after placing the mono pile by filling the remaining portions of the holes with concrete from below.

4. The method according to claim 1, wherein drilling a plurality of holes comprises drilling the plurality of holes such that they are partly overlapping each other.

* * * * *

UNITED STATES PATENT AND TRADEMARK OFFICE
CERTIFICATE OF CORRECTION

| | | |
|---|---|---|
| PATENT NO. | : 7,785,040 B2 | Page 1 of 1 |
| APPLICATION NO. | : 12/628501 | |
| DATED | : August 31, 2010 | |
| INVENTOR(S) | : Jonas Kristensen | |

It is certified that error appears in the above-identified patent and that said Letters Patent is hereby corrected as shown below:

*Column 2
cover page (57) Abstract, "A foundation ...a wind turbine ... and use of such a foundation in a wind turbine is also disclosed." should read --A foundation ... a wind turbine ... and use of such a foundation in a wind turbine are also disclosed.--

*Column 4
line approx. 26-27, "...the forces required to ... is further reduced." should read --...the forces required to ... are further reduced.--

*Column 7
line approx. 57, "llowever, for ..." should read --However, for--

*Column 8
line 49 claim 1, "... placing the monopile." should read --... placing the mono pile.--

Signed and Sealed this
Fifteenth Day of February, 2011

David J. Kappos
*Director of the United States Patent and Trademark Office*